Figure 1:
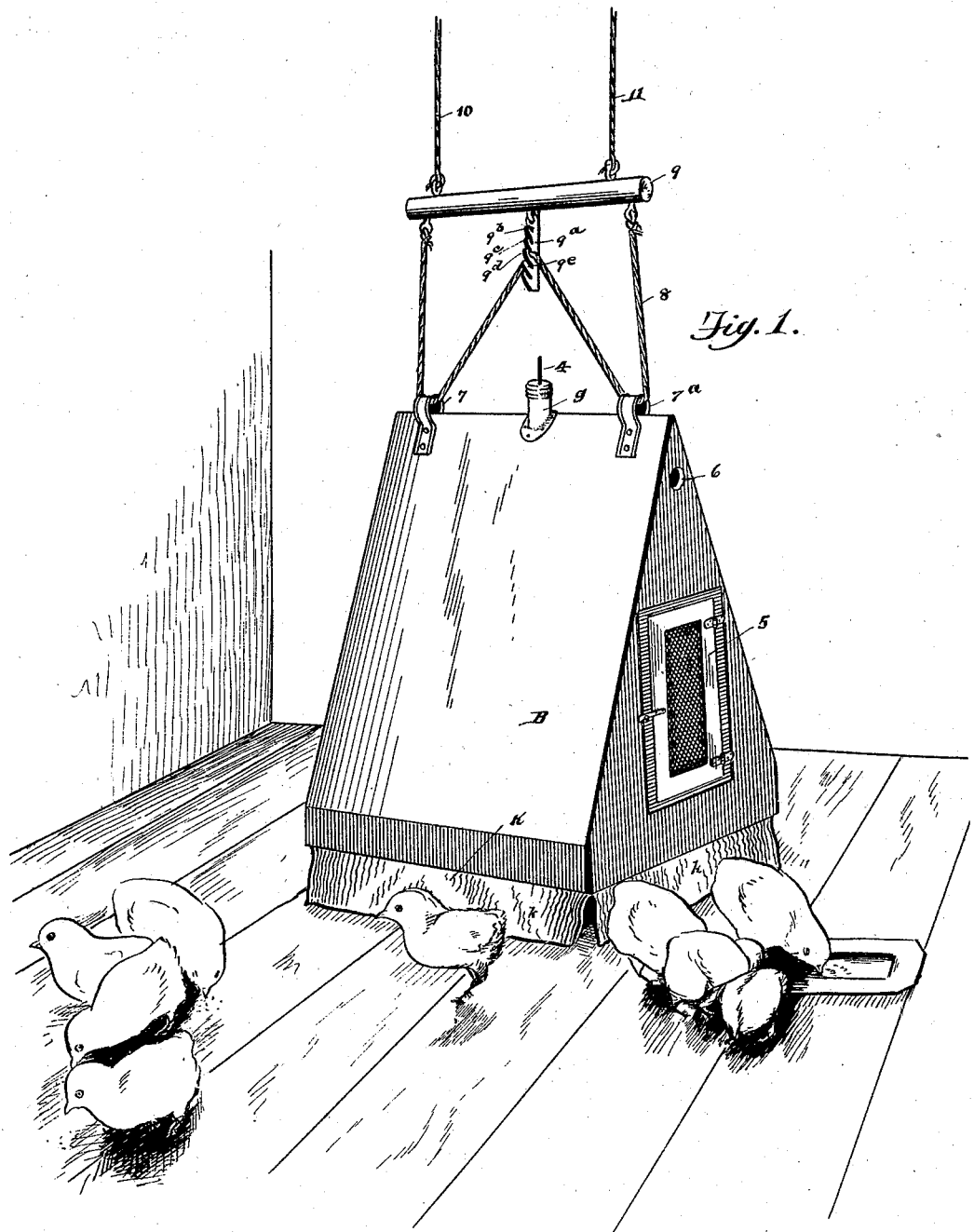

No. 608,043. Patented July 26, 1898.
J. H. HERBENER.
CHICKEN BROODER.
(Application filed Sept. 10 1896.)

(No Model.) 2 Sheets—Sheet 1.

WITNESSES
D. W. Bradford
Ral D. Parker.

INVENTOR
John H. Herbener
By Parker & Burton
Attorneys.

THE NORRIS PETERS CO., PHOTO-LITHO., WASHINGTON, D. C.

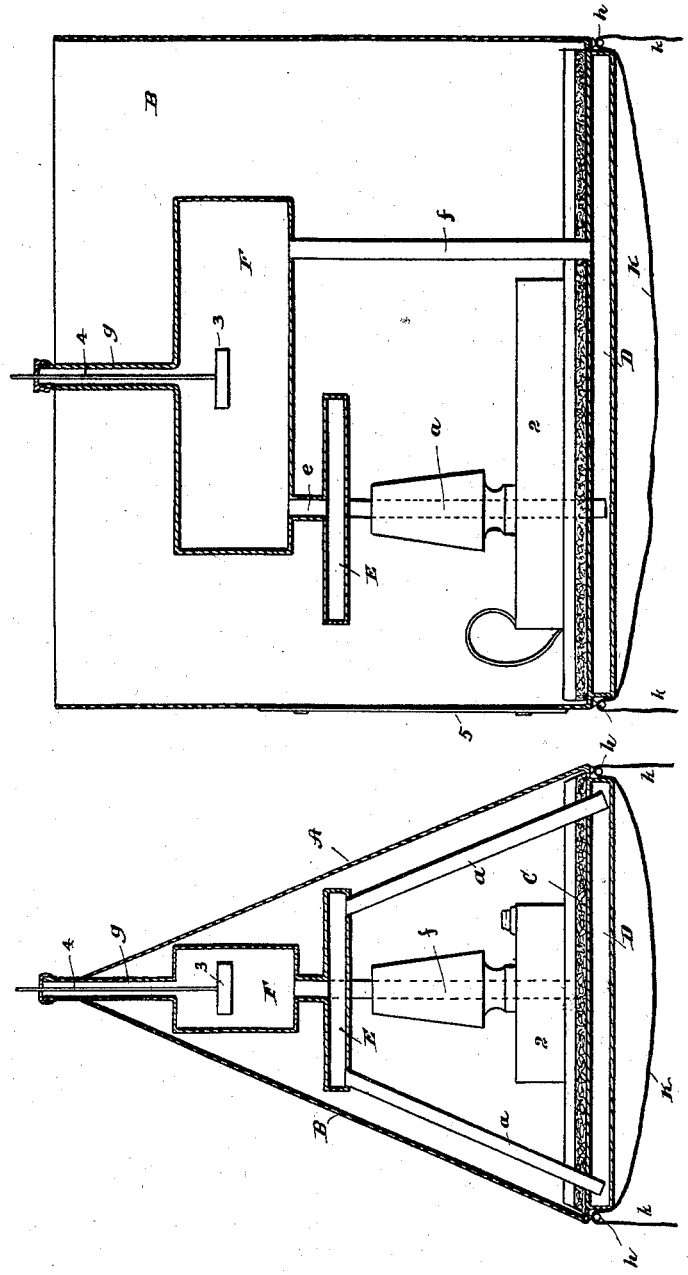

UNITED STATES PATENT OFFICE.

JOHN H. HERBENER, OF NORTHVILLE, MICHIGAN.

CHICKEN-BROODER.

SPECIFICATION forming part of Letters Patent No. 608,043, dated July 26, 1898.

Application filed September 10, 1896. Serial No. 605,357. (No model.)

*To all whom it may concern:*

Be it known that I, JOHN H. HERBENER, a citizen of the United States, residing at Northville, county of Wayne, State of Michigan, have invented a certain new and useful Improvement in Chicken-Brooders; and I declare the following to be a full, clear, and exact description of the invention, such as will enable others skilled in the art to which it pertains to make and use the same, reference being had to the accompanying drawings, which form a part of this specification.

This invention relates to poultry-culture, and has for its object an improved tank brooder.

In the drawings, Figure 1 shows the brooder in perspective. Fig. 2 is a longitudinal vertical central section. Fig. 3 is a cross vertical section.

The brooder consists, essentially, of a triangular box or frame the bottom of which is provided with a tank covering substantially the entire bottom and is adapted to be filled with water, and within the frame provision is made whereby the water is kept at a temperature sufficiently high to furnish the necessary heat for the brooder.

The brooder is intended to be swung from any suitable support above, conveniently from the ceiling of the room in which it is placed, the only essential point in this respect being that the support is sufficiently elevated and has no parts located near the brooder, so that there are in that part of the brooder which is used for the reception of the chicks no corners or walls against which they can be crowded, crushed, or smothered.

A B C indicate the frame of the brooder, which may be made in any desired form or shape, although the shape shown in the drawings (which is wedge shaped) is very convenient and less objectionable than some other shapes that might be devised. At the bottom there is a metal tank D, covering substantially the entire bottom, and rising from this tank are pipes $a\ a$, which extend into the tank D and near to the bottom thereof, leaving, however, a free passage-way into the pipes $a\ a$ for the water which is to circulate through them. In some elevated part of the frame is a second tank E, into which the pipes $a\ a$ lead. The tank E is located high enough so that a lamp 2 or other suitable means of generating heat may be placed beneath it in a position to heat the water in the tank E. From the tank E there is an outflow-pipe $e$ into a supply-tank F, and from the supply-tank F there is a downflow-pipe $f$ into the tank D. Into the tank F leads a filling-pipe $g$, that extends through the top of the frame of the brooder to a place where ready access may be had to it for the purpose of replenishing the water that may be driven off.

3 indicates a float in the tank F, and 4 the stem of the float, and this stem extends through the pipe $g$ and serves to indicate the depth of the water in the tank F.

At one end of the brooder is a gauze-covered door 5, and above the door in the apex of the frame there is at each end an opening 6 to permit egress of products of combustion from the lamp.

7 $7^a$ indicate loops or hooks attached to the apex of the brooder, through which is run a suspending-cord 8.

9 indicates a cross-bar suspended from the cords 10 11, which are intended to be attached to the ceiling or any other support. $9^a$ is a "take-up" catch suspended from the bar 9, and this take-up catch is provided with a number of hooks $9^b\ 9^c\ 9^d\ 9^e$, into any one of which hooks may be caught the suspending-cord 8. The elevation of the brooder from the floor is roughly adjusted by the length of the cords 10 11 and is more carefully adjusted and may be changed at will by the engagement between the cord 8 and the hooks on the take-up $9^a$.

On the under side of the brooder and below the tank D is loosely suspended a cloth K, preferably of some woolen material, and the ends and sides of the cloth K are arranged to drop down in curtains at $k\ k$. The cloth K may be secured by tacks or, preferably, may be drawn over suspension-wires $h\ h$.

The hanging flaps or curtains $k\ k$ yield readily before the chickens pushing their way through in or out of the brooding-chamber, while the loose loop K of the cloth furnishes a warm covering over the backs of the chicks that cannot drop low enough to injure them or even rest heavily upon them.

The heat in this brooder is above and radiates downward in the natural way and may be regulated after a little experience by changing the amount of water in the tanks, so that the temperature will rise to the required point and remain practically at that point so long as the lamp continues to burn.

The dropping curtains k k prevent drafts, while they permit free egress and ingress to the chicks and allow them to roam at will through the room in which the brooder is located. At the same time the brooder is cleanly, in that there are no interior parts to be cleaned, as it can be swung to one side and the floor swept without any difficulty.

What I claim is—

1. In a chicken-brooder, the combination of a chamber containing a heat-generator and a heat-radiator, a suspension-cord, supports from which the suspension-cord hangs and which engage the cord and from which the chamber is otherwise entirely disengaged, whereby the chamber is adapted to swing freely and to yield in any direction and may be swung entirely to one side leaving the floor of the brooding-chamber uncovered, substantially as described.

2. In a chicken-brooder the combination of a chamber containing a radiating water-tank and means for heating the water therein, suspension-cords arranged to hold the chamber and allow it to swing clear from the floor, a support for the suspension-cord, curtains dropping from the radiating water-tank and inclosing a brooding-chamber beneath the same, and a guarding-partition of cloth hanging free from the radiating-wall beneath the bottom of said tank and adapted to prevent actual contact of the chickens with the bottom of said tank, substantially as described.

3. In combination with a brooding-chamber containing a heat-radiator and means for heating the same, suspension-cords whereby said radiator may be held from above, and arranged to swing freely, a cross-bar held by the main suspension-cords, a second suspension-cord engaging the cross-bar and passing through loops in the brooding-case, a take-up catch provided with a number of hooks either of which is adapted to engage a bight of the second suspension-cord, whereby the elevation of the brooder may be adjusted, substantially as described.

4. In a chicken-brooder, the combination of a radiator, flexible curtains depending from the sides thereof, a guard below the radiator, and flexible suspending means whereby the radiator is swung over a floor from an overhead support and is free to move in all directions.

In testimony whereof I sign this specification in the presence of two witnesses.

JOHN H. HERBENER.

Witnesses:
CHARLES F. BURTON,
VIRGINIA M. CLOUGH.